Patented Oct. 5, 1954

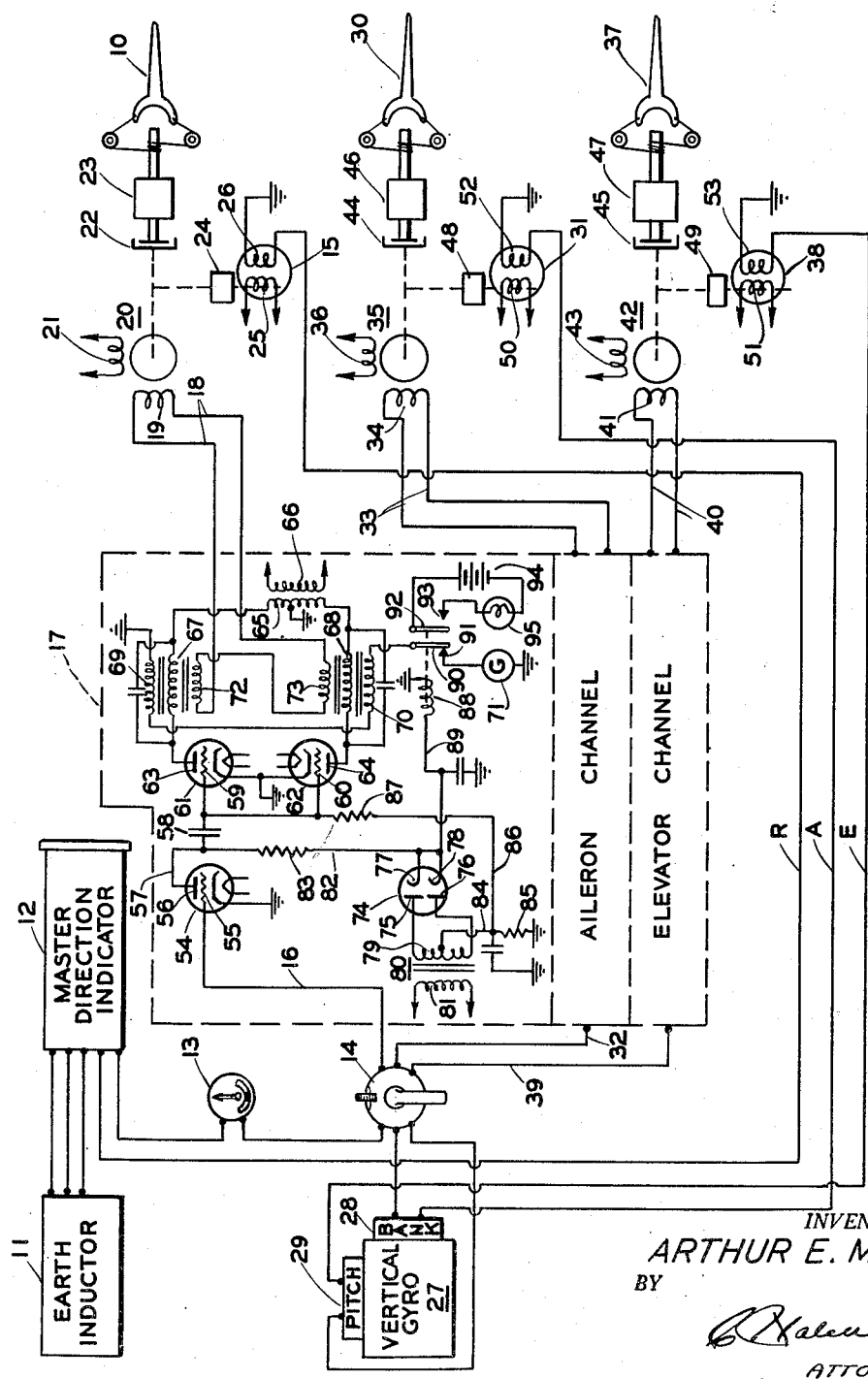

2,691,122

UNITED STATES PATENT OFFICE 2,691,122

POSITIONING SYSTEM MONITOR

Arthur E. Moog, Caldwell, N. J., assignor to Bendix Aviation Corporation, Teterboro, N. J., a corporation of Delaware Application January 25, 1950, Serial No. 140,395

2 Claims. (Cl. 318—18)

This invention relates to safety devices for aircraft automatic pilot systems generally and more particularly to a novel monitoring circuit which will de-energize automatically the servomotors of the system in response to a loss of power supply to the amplifier and thereby prevent undesirable and uncontrolled servo operation of the craft surfaces.

With any system as intricate as an aircraft electric automatic pilot there are bound to be sources of trouble which may cause the system at times to operate erratically or even dangerously. One pilot system currently in use depends on two phase induction servomotors for controlling the rudder, aileron and elevator surfaces. The variable phase of each servomotor is connected to the secondary winding of a magnetic amplifier of each of the three amplification channels. Immediately preceding the magnetic amplifiers are pairs of discriminator tubes whose plate currents control the magnetic amplifiers and thus the direction and extent of rotation of the motors. The input of the discriminator stage is fed from the plate circuit of an amplifier tube and the plate supply for the latter tube as well as the grid bias for the discriminator tubes is derived from a rectifier tube and it has been found that failure of the rectifier power supply can cause uncontrolled servomotor operation because of the variation in the transconductance of the discriminator tubes. By the present invention novel means are provided which in response to the loss of the rectifier power supply will de-energize the servomotors so that uncontrolled operation of the control surfaces is prevented.

An object of the present invention, therefore, is to provide a novel aircraft automatic pilot monitor.

Another object of the invention is to provide a novel safety arrangement for monitoring the operation of an aircraft automatic pilot to assure the proper operation thereof.

A further object is to provide a novel safety device for an aircraft electric automatic pilot which in response to failure of the power supply will operate automatically to make the automatic pilot ineffective on the craft control surfaces.

A still further object of the invention is to provide in a positioning system utilizing a motor for operating a controlled member and an electronic amplifier for controlling motor operation, novel apparatus responsive to malfunction of amplifier power supply for making the motor ineffective to amplifier output.

The above and other objects and advantages of the invention will appear more fully hereinafter from a consideration of the description which follows when taken together with the accompanying drawing wherein one embodiment of the invention is illustrated. It is to be expressly understood, however, that the drawing is for the purpose of illustration and description only and is not designed as a definition of the limits of the invention.

The single figure of the drawing is a diagrammatic illustration of one embodiment of the novel safety arrangement of the present invention for monitoring the operation of an aircraft automatic pilot.

Referring now to the single figure of the drawing for a more detailed description of the novel safety arrangement hereof, the latter is shown as applied to a conventional all electric, three axes of control, aircraft automatic pilot. As there shown, such an automatic pilot generally comprises for the displacement of a rudder surface 10, a compass consisting of a stabilized earth inductor element 11 and a master direction indicator 12 which receives and reproduces for control purposes the signals of element 11. In addition to the compass signal, rate of turn, course turn, and follow-up signals are developed by a rate of turn device 13, a turn signal generator incorporated in a manual turn controller unit 14, and a two-part inductive follow-up device 15.

The various signal generators are series connected with each other and by way of a conductor 16 with the input of the rudder channel of an amplifier 17 to be more fully described hereinafter, the output of which is fed by way of leads 18 to the variable phase 19 of a two-phase induction motor 20 whose second phase winding 21 is connected with a suitable source of current. Motor 20 drivably connects through an electromagnetic clutch 22 and a gear reduction mechanism 23 with the rudder surface and through a second gear reduction mechanism 24 with the wound rotor 25 of inductive follow-up device 15, whose stator winding 26 is fixed with respect to the craft.

In order to control the craft in bank and pitch a vertical gyro 27 is provided having bank and pitch take-offs or signal generators 28 and 29. For displacing aileron surface 30, bank, follow-up and bank trim signals are provided by bank take-off 28, an inductive follow-up device 31, and a bank trim signal generator incorporated in turn control unit 14. The various signals of the bank channel are series connected with each other and by way of a conductor 32 with the input of the aileron channel of amplifier 17, the output of the latter channel connecting by way of leads 33 with the variable phase winding 34 of a two-phase induction motor 35, whose second phase winding 36 is connected with a suitable source of current.

In order to control elevator surface 37, on the other hand, pitch, follow-up and pitch trim signals are provided by pitch take-off 29, an inductive follow-up device 38 and a pitch trim signal generator incorporated in turn control unit 14. These signals, like those of the rudder and aileron channels, are series connected with each other and by way of a conductor 39 with the input of the elevator channel of amplifier 17, the output of which connects by way of leads 40 with the variable phase winding 41 of a two-phase induction motor 42, whose second phase winding 43 is connected with a suitable source of current.

Aileron and elevator servomotors 35 and 42 drivably connect through electromagnetic clutches 44 and 45 and gear reduction mechanisms 46 and 47 with aileron and elevator surfaces 30 and 37 and through second gear reduction mechanisms 48 and 49 with wound rotors 50 and 51 of inductive follow-up devices 31 and 38, whose stator windings 52 and 53 are fixed with respect to the craft.

Amplifier 17, as heretofore indicated, includes three channels, i. e., rudder, aileron and elevator channels, and is shown and more fully described in copending application Serial No. 516,488, filed December 31, 1943. All of the channels are substantially the same and for that reason only the rudder channel has been shown for purposes of simplicity. At the input stage of the rudder channel is a triode amplifier tube 54 whose grid 55 is connected with lead 16 to have the rudder control signals impressed thereon. Plate 56 of the tube connects by way of a lead 57 and a condenser 58 with the grids 59 and 60 of discriminator tubes 61 and 62. Plates 63 and 64 of the discriminator tubes, on the other hand, connect with the opposite ends of a center tapped and grounded secondary winding 65 of a transformer whose primary winding 66 is connected to a suitable source of A. C. voltage supply. Interposed in the plate connections of the latter tubes are series connected saturating windings 67 and 68 which are associated with the core (not shown) of a magnetic amplifier having series connected primary windings 69 and 70 energized from a suitable source 71 of alternating current, such as an alternator, for example, and series opposed windings 72 and 73, the latter connecting by way of leads 18 with the variable phase winding of servomotor 20.

As more fully described in the aforementioned copending application, with no signal at the amplifier input the magnetic amplifier will be balanced and no signal will appear at the output of secondary windings 72 and 73. When, however, an alternating current signal is impressed on grid 55 of amplifier tube 54 it will produce a plate current at either plate 63 or 64 of the discriminator tubes, depending upon the phase of the signal impressed on grid 55. A unidirectional current will, therefore, flow in one or the other of saturating windings 67 or 68 to unbalance the magnetic amplifier so that a voltage will appear at secondary windings 72 and 73 to energize and drive motor 20.

Plate supply for tube 54 is provided at the output of a rectifier tube 74 which has a pair of anodes 75 and 76 and parallel connected cathodes 77 and 78. Anode 75 connects with one end of a secondary winding 79 of a transformer 80 whose primary winding 81 is connected to a suitable source of alternating current while anode 76 connects with the opposite end of secondary 79. Rectifier output is connected with plate 56 of tube 54 by way of a conductor 82 and a resistor 83. Secondary winding 79 is center tapped by way of a conductor 84, the latter being grounded by way of a resistor 85 and the junction of the two connecting by way of a lead 86 and a resistor 87 with the grids 59 and 60 of the discriminator tubes to provide a bias therefor.

It has been found with the above system that in case of malfunction of rectifier tube 74 causing loss of bias voltage to grids 59 and 60 of the discriminator tubes which are biased to near cut-off and loss of plate supply to triode 54, plate current in the discriminator tubes will rise to static levels controlled only by the transconductance of the discriminator tubes which is variable. Since transconductance is variable between tubes, the plate currents will rise to different static levels, thereby unbalancing the magnetic amplifier and feeding a signal to motor 20. The servomotor will run, therefore, under such conditions regardless of control signal on grid 55. In this manner, undesirable or dangerous "hard-over" servo operation may develop.

In accordance with the present invention, a novel arrangement is provided which, in response to malfunction of the rectifier, will automatically make the servo motor ineffective to the amplifier output, such arrangement constituting a relay having a coil 88 grounded at one end and connected at its other end by way of a lead 89 with the output of the rectifier. The relay, when energized, maintains a movable armature 90 in engagement with a fixed contact 91, the armature connecting with one end of primary winding 70 of the magnetic amplifier, the other primary 69 being grounded as shown, and the contact connecting with alternator 71. Also, when energized, the relay maintains a movable armature 92 out of engagement with a fixed contact 93, the armature connecting with one side of a battery 94 and the contact connecting through a warning lamp 95 with the other side of the battery.

It will now be apparent that when rectifier 74 is operating properly, the direct current at its output, constituting the plate supply for amplifier tube 54 and the bias voltage for the grids of the discriminator tubes, also energizes relay coil 88 so that armature 90 is maintained engaged with contact 91 to provide alternating current in the primary windings 69 and 70 of the magnetic amplifier. At the same time the relay will maintain warning light 95 extinguished. Under these conditions the servo motor will operate in extent and direction depending upon the phase and the magnitude of the A. C. signal applied to grid 55 of the amplifier tube, such signal unbalancing one side or the other of the magnetic amplifier to provide the proper motor operating signal at leads 18.

Should for some reason rectifier tube 74 operate improperly either due to a short in the tube or due to an open lead at the input or output of the tube thereby cutting off plate supply and bias voltage, relay coil 88 will be de-energized and movable armature 92 will engage fixed contact 93 to light warning lamp 95 and advise the human pilot of such condition while movable armature 90 will disengage fixed contact 91 and thus remove the source of potential for primary windings 69 and 70 of the magnetic amplifier. In this manner one phase of the servo motor is effectively de-energized so that the motor is made ineffective to the amplifier output and the possibility of "hard-over" servo control is eliminated.

While the novel monitoring circuit hereof has been shown in detail in connection with only the rudder channel of amplifier 17, it will be understood that the aileron and elevator channels are duplicates of the rudder channel and will operate in exactly the same manner as that described in connection with the rudder channel.

It will now be readily understood by those skilled in the art that a novel and simple monitoring arrangement has been provided for eliminating the possibility of improper operation of one or more aircraft control surfaces by an automatic pilot.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. A positioning system comprising a motor adapted for displacing a controlled member, an amplifier having an output connected to the motor and an input connected to receive a reversible control signal, said amplifier including a thermionic tube having an input controlled by said signal and an output, discriminator tubes having inputs controlled by the output of said thermionic tube and also having outputs, and normally balanced transformer means associated with the amplifier output and adapted for unbalance by the outputs of said discriminator tubes, an A. C. source of potential, said transformer means being connected to said A. C. source for energization, a source of D. C. voltage for supplying plate voltage to said thermionic tube and bias voltage to said discriminator tubes, and a monitor operatively associated with said D. C. voltage source and responsive to failure of said D. C. voltage source for disconnecting the transformer means from said A. C. source of potential.

2. An electronic pilot comprising a motor adapted for displacing a craft surface such as a rudder, an amplifier having an output connected to the motor and an input connected to receive a reversible control signal, said amplifier including a thermionic tube having an input controlled by said signal and an output, discriminator tubes having inputs controlled by the output of said thermionic tube and also having outputs, and normally balanced transformer means associated with the amplifier output and adapted for unbalance by the outputs of said discriminator tubes, an A. C. source of potential, said transformer means being connected to said A. C. source, a source of D. C. voltage constituting a plate supply for said thermionic tube and bias voltage for said discriminator tubes, relay means energized by said D. C. source responsive to failure of said D. C. voltage source for disconnecting the transformer means from said A. C. source of potential, and warning means operative by said relay means.

References Cited in the file of this patent

UNITED STATES PATENTS

| Number | Name | Date |
|---|---|---|
| 2,077,179 | Moseley et al. | Apr. 13, 1937 |
| 2,386,149 | Smith | Oct. 2, 1945 |
| 2,432,036 | Noxon | Dec. 2, 1947 |
| 2,473,344 | McCown | June 14, 1949 |
| 2,487,793 | Esval et al. | Nov. 15, 1949 |
| 2,634,391 | Rusler | Apr. 7, 1953 |

OTHER REFERENCES

Publication, "Smiths Controlled Flight System," SA1/EP108, issued in September 1948, by Smiths Aircraft Instruments Limited, Cricklewood, London, N. W. 2, England, pp. 21 and 33.